United States Patent
Shevrin et al.

(10) Patent No.: US 11,722,526 B1
(45) Date of Patent: Aug. 8, 2023

(54) SECURITY POLICY VALIDATION

(71) Applicant: CITIBANK, N.A., New York, NY (US)

(72) Inventors: Ilia Shevrin, Ramat Gan (IL); Mickey Hovel, Ashdod (IL); Max Leibovich, Ramla (IL); Oded Margalit, Ramat Gan (IL); Uri Kahana, Givat-Ada (IL)

(73) Assignee: CITIBANK, N.A., New York, NY (US)

( * ) Notice: Subject to any disclaimer, the term of this patent is extended or adjusted under 35 U.S.C. 154(b) by 151 days.

(21) Appl. No.: 17/232,607

(22) Filed: Apr. 16, 2021

(51) Int. Cl.
*H04L 29/06* (2006.01)
*H04L 9/40* (2022.01)
*H04L 41/14* (2022.01)

(52) U.S. Cl.
CPC ............ *H04L 63/20* (2013.01); *H04L 41/145* (2013.01)

(58) Field of Classification Search
CPC ..... H04L 63/20; H04L 63/08; H04L 63/0892; H04L 63/1408; G06F 21/30; G06F 21/50
USPC ............................................................ 726/1
See application file for complete search history.

(56) References Cited

U.S. PATENT DOCUMENTS 8,805,766 B2 * 8/2014 Ray ...................... G06F 16/345
706/47
9,124,619 B2 * 9/2015 Foley .................. H04L 63/1425

* cited by examiner

*Primary Examiner* — Longbit Chai
(74) *Attorney, Agent, or Firm* — Johnson, Marcou, Isaacs & Nix, LLC; George Marcou; Scott A. Hendrix

(57) ABSTRACT

A model checking system detects violations and conflicts in security and verification policies by running model checking processes. The system detects privilege escalation attacks in misconfigured identification and access management ("IAM") policies by modeling security policy documents and IAM actions as logical formulas and then running model checking on the model. The system translates non-Boolean variables, such as string variables, into Boolean variables in order to apply an SAT model checker. The model checker also determines whether a policy violation can be achieved in a finite number of steps by elevating privileges of some compromised principal over multiple iterations of the model checking process, or proves absence thereof.

20 Claims, 5 Drawing Sheets

SECURITY POLICY VALIDATION

FIELD OF THE INVENTION

The present invention relates generally to the field of security policy evaluation, and more particularly to methods and systems for detecting violations and conflicts in security and verification policies by performing model checking processes on system models.

BACKGROUND OF THE INVENTION

Organizations that utilize online, cloud-based, and networked access for users and customers employ policies to limit access to secure documents and applications. In identity and access management ("TAM") systems, certain users are provided access to only certain customer-facing documents, applications, or other resources. Other users, such as network administrators, may be granted access to network services applications but not access to sensitive or private customer data. Other users, such as an officer of the organization may be granted access to all resources on the networked system.

The policies are designed to prevent users from intentionally or accidentally being granted access to documents, programs, applications, or other information that are restricted, secure, or private. In particular, potentially malicious actors may attempt to identify conflicts, loopholes, or other policy violations to gain access to restricted information. Some malicious actors may use escalation attacks to exploit compromised identities to elevate their privileges in the system to gain access to previously inaccessible information. For example, an actor with only customer status attempts to escalate his or her status to network administrator status to allow access to secure documents.

There is a present need for a solution that resolves all of the foregoing issues and provides, for example, improved methods and systems to analyze policies to identify mismatched and conflicting rules or restrictions.

SUMMARY OF THE INVENTION

Embodiments of the invention employ computer hardware and software, including, without limitation, one or more processors coupled to memory and non-transitory computer-readable storage media with one or more executable programs stored thereon that instruct the processors to perform the methods and processes described herein. Such embodiments are directed to technological solutions that may involve systems that include, for example, at least one processor coupled to memory and programmed to detect violations and conflicts in security and verification policies by running model checking processes. The system detects privilege escalation attacks in misconfigured identification and access management ("TAM") policies by modeling security policy documents and TAM rules and procedures as logical formulas and then running model checking on the model. The system translates non-Boolean variables, such as string variables, into Boolean variables in order to apply a Boolean Satisfiability ("SAT") solver inside the model checker. Other model checkers may be used to identify policy violations, such as a Binary Decision Diagram based model checker or other similar model checkers. The model checker determines whether a policy violation can be achieved in a finite number of steps by elevating privileges of some compromised principal over multiple iterations of the model checking process.

In an example, a system includes a storage device and a processor in a network system communicatively coupled to the storage device, wherein the processor executes application code instructions that are stored in the storage device to cause the system to identify static and dynamic features of an TAM system operated by a network computing system; represent the features as mathematical formulas to create an abstract model of the TAM system, convert string variables of the abstract model to Boolean variables, and apply a Boolean SAT solver on the abstract model to identify policy violations in the features.

In aspects of embodiments of the invention, the system further receives user data from a user computing device. In other aspects, the system applies a Boolean SAT solver that simulates actions of a user identity and the TAM system to identify the policy violations. In other aspects, the string variables include string data comprising one or more of string length, string characters, and indexes. In other aspects, the string variables are word level variables comprising letters, numbers, spaces, or commas. In other aspects, converting string variables of the abstract model, representing a regular expression in a policy condition to Boolean variables includes determining if a name associated with a resource matches a regular expression across policies of the IAM system.

In other aspects of embodiments of the invention, a policy violation is identified when a simulated user identity is granted access to a particular feature although he or she is initially restricted from access to the particular feature by evaluation of all policies attached to the user identity. In many example systems, a most restrictive policy or rule controls user access. In other aspects, the system receives a request to evaluate the IAM system from a computer network system associated with the IAM system. In other aspects, the static features are associated with services and their characteristics in the documentation provided by a cloud computing system providing services to the IAM system. In other aspects, the dynamic features are associated with services and configuration of the IAM system provided by the network computing system hosting or utilizing the IAM system. In other aspects, the dynamic features are associated with policies managed by the IAM system. In other aspects, the system reports identified policy violations to the network computing system or reports to the network computing system that policy violations were not identified.

In other aspects of embodiments of the invention, a method performed by a network computing system includes identifying features of an IAM system operated by a network computing system, representing the features as mathematical formulas to create an abstract model of the IAM system, applying a model checker on the abstract model to identify policy violations in the features based on a first simulation with an initial set of data, updating the model based on the first simulation, and applying the model checker on the abstract model to identify policy violations in the features based on a second iteration with the updated model.

In other aspects of embodiments of the invention, the system applies the model checker by simulating actions of a user identity and the IAM system to identify the policy violations. In other aspects, a policy violation is identified when a simulated user identity is granted access to a particular feature although he or she is initially restricted from access to the particular feature by evaluation of combination of several restrictive policies. In many example systems, a most restrictive policy or rule controls user access. In other aspects, the simulated user identity is granted access to a particular feature by a first policy and restricted from access to the particular feature by a second policy only after a plurality of intermediate steps in a series of simulation steps. In other aspects, the simulated user identity is initially restricted from access to a particular feature by a first policy and subsequently granted access to the particular feature after altering a status of the simulated user identity in a first simulation step.

Other aspects include computer program products that perform the methods and actions described herein.

These and other aspects of the invention will be set forth in part in the description that follows and in part will become more apparent to those skilled in the art upon examination of the following or may be learned from practice of the invention. All such aspects are to be included within this description, are to be within the scope of the present invention, and are to be protected by the accompanying claims.

DETAILED DESCRIPTION

Example System Architecture

In example architectures for the technology, while each server, system, and device shown in the architecture is represented by one instance of the server, system, or device, multiple instances of each can be used. Further, while certain aspects of operation of the technology are presented in examples related to the figures to facilitate enablement of the claimed invention, additional features of the technology, also facilitating enablement of the claimed invention, are disclosed elsewhere herein.

Figure 1:
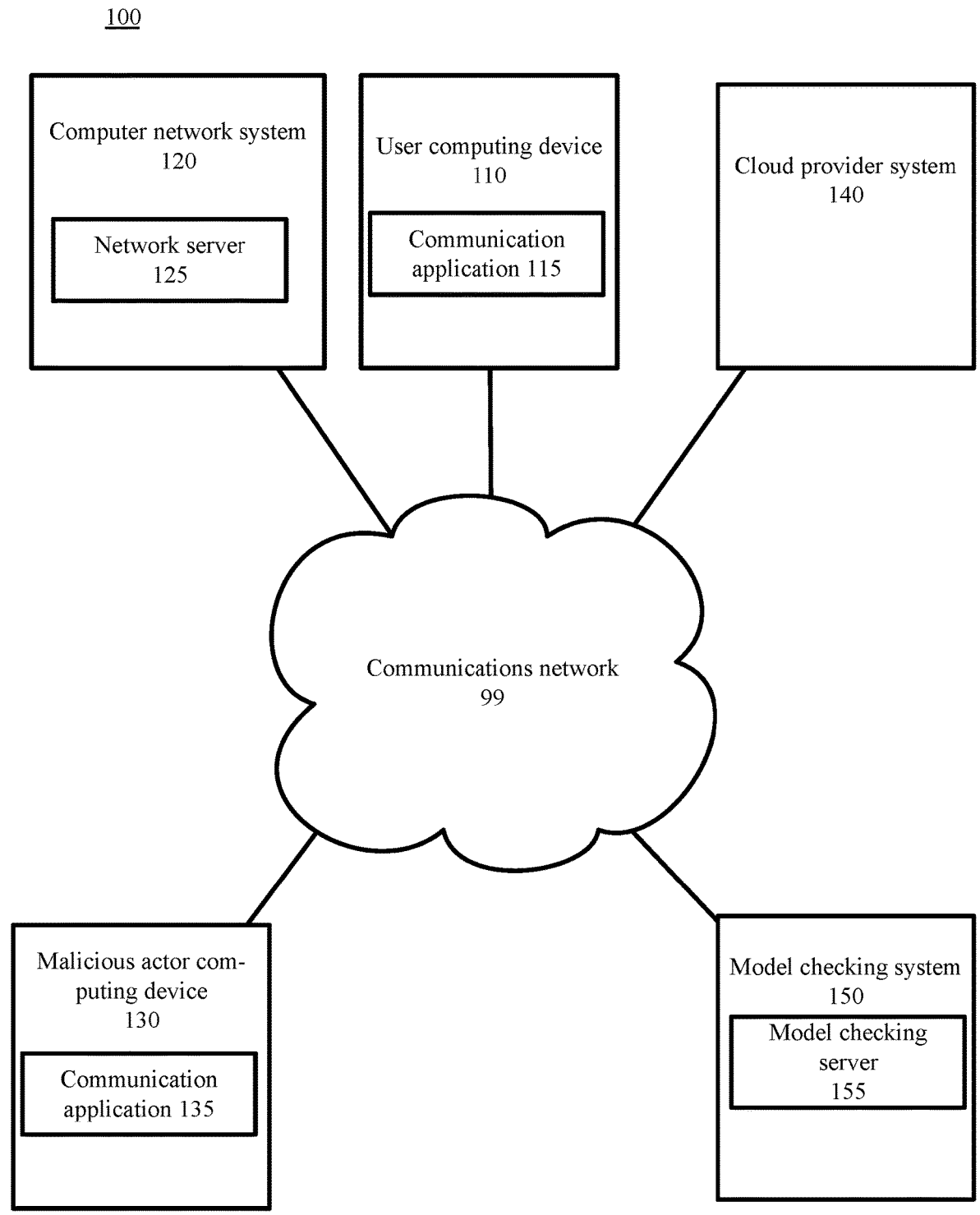
FIG. 1 is a block diagram depicting a system to detect violations and conflicts in identification and access management ("IAM") policies, in accordance with certain examples.

FIG. 1 is a block diagram depicting a system to detect violations and conflicts in identification and access management ("JAM") policies, in accordance with certain examples. As depicted in FIG. 1, the architecture 100 includes a computer network system 120, one or more user computing devices 110, a malicious actor computing device 130, a cloud provider system 140, and a model checking system 150 connected by communications network 99.

Each network, such as communication network 99, includes a wired or wireless telecommunication mechanism and/or protocol by which the components depicted in FIG. 1 can exchange data. For example, each network 99 can include a local area network ("LAN"), a wide area network ("WAN"), an intranet, an Internet, a mobile telephone network, storage area network (SAN), personal area network (PAN), a metropolitan area network (MAN), a wireless local area network (WLAN), a virtual private network (VPN), a cellular or other mobile communication network, Bluetooth, NFC, Wi-Fi, or any combination thereof or any other appropriate architecture or system that facilitates the communication of signals or data. Throughout the discussion of example embodiments, it should be understood that the terms "data" and "information" are used interchangeably herein to refer to text, images, audio, video, or any other form of information that can exist in a computer-based environment. The communication technology utilized by the components depicted in FIG. 1 may be similar to network technology used by network 99 or an alternative communication technology.

Each component depicted in FIG. 1 includes a computing device having a communication application capable of transmitting and receiving data over the network 99 or a similar network. For example, each can include a server, desktop computer, laptop computer, tablet computer, a television with one or more processors embedded therein and/or coupled thereto, smart phone, handheld or wearable computer, personal digital assistant ("PDA"), other wearable device such as a smart watch or glasses, wireless system access point, or any other processor-driven device.

In the example embodiment depicted in FIG. 1, the user computing device 110 is operated by an end-user or consumer, the wireless computing system 120 is operated by a wireless system operator, the malicious actor computing device 130 is operated by an malicious actor or other user, a cloud provider system 140 is operated by a cloud provider system operator, and a model checking system 150 is operated by a model checking system operator.

As shown in FIG. 1, the user computing device 110 includes a data storage unit (not shown) accessible by a communication application 115. The communication application 115 on the user computing device 110 may be, for example, a web browser application or a stand-alone application, to view, download, upload, or otherwise access documents or web pages via the networks 99. The communication application 115 can interact with web servers or other computing devices connected to the network 99.

In some embodiments, the user associated with a user computing device 110 can install an application and/or make a feature selection to obtain the benefits of the techniques described herein.

As shown in FIG. 1, the wireless computing system 120 includes a server 125. The server 125 or one or more other suitable devices are used to perform the computing functions of the wireless computing system 120. In an example, the server 125 stores received data, stores user account data, maintains identification and access management ("IAM") functions, performs determinations related to user access, provides applications or website services, or performs any other suitable actions. Any other computing or storage function required by the wireless computing system 120 may be performed by the server 125. The server 125 may represent any number of servers, cloud computing devices, or other types of device for performing the tasks described herein.

As shown in FIG. 1, the malicious actor computing device 130 includes a data storage unit (not shown) accessible by a communication application 135. The communication application 135 on the malicious actor computing device 110 may be, for example, a web browser application or a stand-alone application, to view, download, upload, or otherwise access documents or web pages via the networks 99. The communication application 135 can interact with web servers or other computing devices connected to the network 99.

The cloud provider system 140 represents any system or computing device that is used to provide cloud computing services to the computer network system 120, the user device 110, the malicious actor computing device 130, the model checking system 150, or any other suitable system or device. The cloud provider system 140 may allow a device such as the server 125 of the computer network system 120 to host online services for users, store online data, distribute storage virtually, provide applications to user computing devices 110, or perform any other cloud-based services.

The model checking system 150 includes a server 155. The server 155 or other suitable device is used to perform the computing functions of the model checking system 150. In an example, the server 155 stores received data from the computer network system 120 and the cloud provider system 140, stores rules and policies, creates models, converts string functions of model data to Boolean functions, performs model checks, analyzes IAM functions, performs determinations related to user access, or performs any other suitable actions. Any other computing or storage function required by the model checking system 150 may be performed by the server 155. The server 155 may represent any number of servers, cloud computing devices, or other types of device for performing the tasks described herein. In certain examples, some or all of the functions of the model checking system 150 and the server 155 are performed by the computer network system 120, the cloud provider system 140, or any other suitable computing device or service.

Figure 5:
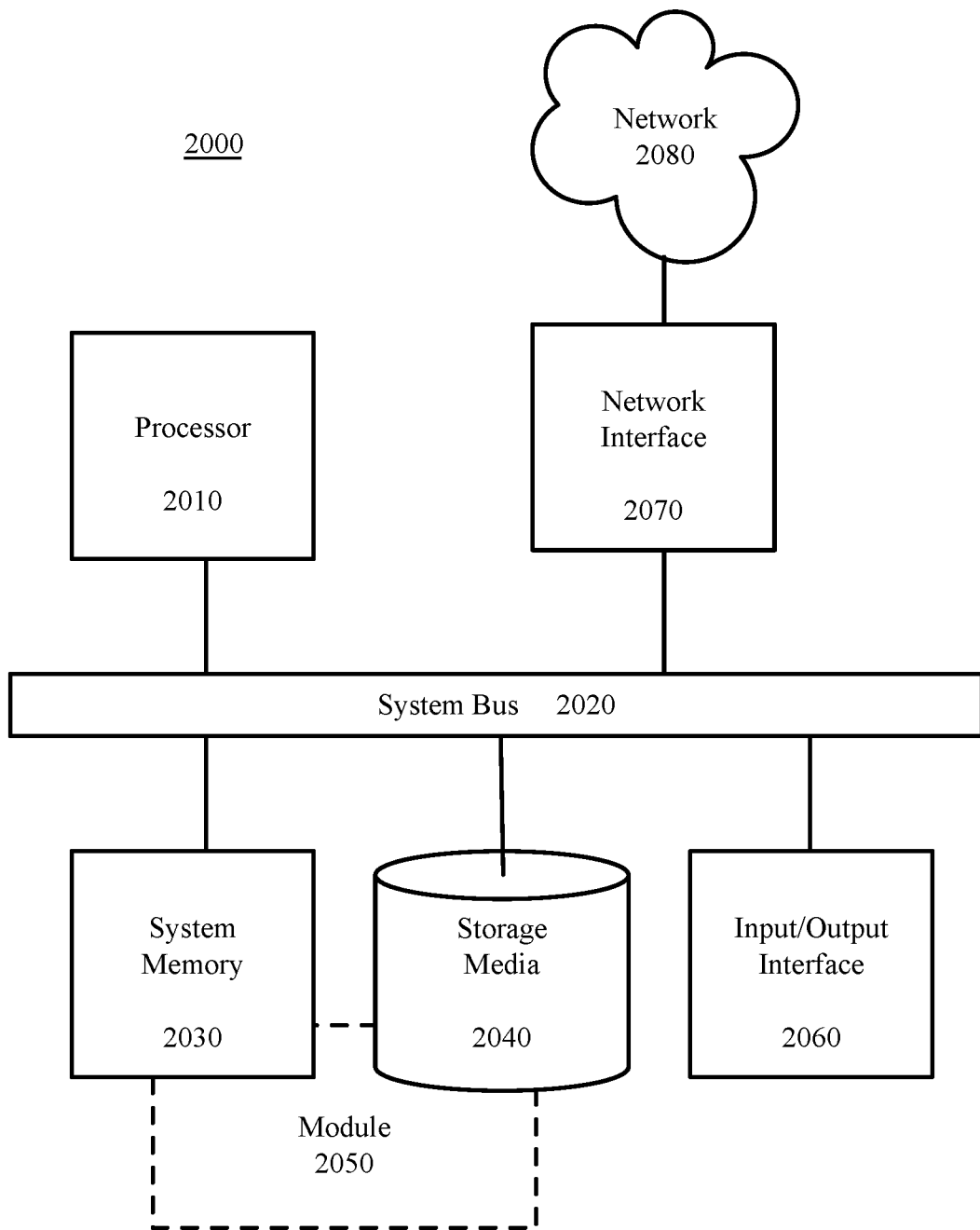
FIG. 5 depicts a computing machine and a module.

In example embodiments, the network computing devices and any other computing machines associated with the technology presented herein may be any type of computing machine such as, but not limited to, those discussed in more detail with respect to FIG. 5. Furthermore, any functions, applications, or components associated with any of these computing machines, such as those described herein or any other others (for example, scripts, web content, software, firmware, hardware, or modules) associated with the technology presented herein may by any of the components discussed in more detail with respect to FIG. 5. The computing machines discussed herein may communicate with one another, as well as with other computing machines or communication systems over one or more networks, such as network 99. The network 99 may include any type of data or communications network, including any of the network technology discussed with respect to FIG. 5.

Example Embodiments

Reference will now be made in detail to embodiments of the invention, one or more examples of which are illustrated in the accompanying drawings. Each example is provided by way of explanation of the invention, not as a limitation of the invention. Those skilled in the art will recognize that various modifications and variations can be made in the present invention without departing from the scope or spirit of the invention. For example, features illustrated or described as part of one embodiment can be used in another embodiment to yield a still further embodiment. Thus, the present invention covers such modifications and variations that come within the scope of the invention.

The technology for embodiments of the invention may employ methods and systems for detecting violations and conflicts in security and verification policies by running model checking processes. The model for embodiments of the invention may employ computer hardware and software, including, without limitation, one or more processors coupled to memory and non-transitory computer-readable storage media with one or more executable computer application programs stored thereon, which instruct the processors to perform such methods.

The system detects privilege escalation attacks in misconfigured identification and access management ("IAM") policies by modeling security policy documents and IAM actions as logical formulas and then running model checking processes on the model. The model checker also receives a logical formula describing a policy violation ("bug"), and checks whether the policy violation can be achieved in a finite number of steps by elevating privileges of some compromised principal. The output of the model checker is a finite trace leading to a bug, a safety violation, or any other type of policy violation. The model checker simulates the course of actions a malicious actor may undertake in order to achieve a certain goal, such as to access a restricted resource, to gain administrator privileges, or in any other way escalate the privileges the malicious party should be granted. In an example, such adversarial course of actions may involve altering the policy document during intermediate steps, in order to alleviate or reduce privileges associated with specific identities to achieve the violation.

The examples described herein are primarily directed to IAM policies, but the examples are applicable to any safety critical software and hardware systems. The IAM system is formally modeled as a set of logical formulas describing its behavior. This model is then fed into a model checker, which then exhaustively looks for logical violations in its model, for every possible run of the system. If it completes the run, it will either output a detection of a bug for a certain run of the system, or alternatively prove that the system is safe. In examples of model checkers, the systems may encode the conditions in a satisfiability modulo theories ("SMT") formula and applying a SMT solver for the validation. In examples herein, the terms bug, policy violation, or other descriptions of conflicts, loopholes, or other security flaws may be used interchangeably to describe a problem with the policies that compromises the security of the system.

In certain examples, the system translates non-Boolean variables, such as string variables, into Boolean variables in order to apply an SAT model checker. By encoding the non-Boolean variables into Boolean variables, the system is able to reduce the amount of processing power, time, bandwidth, and required processing capacity of the server or other device operating the model checker. An SMT based model checker attempting to perform model checking on non-Boolean variables requires significantly more processing time and capacity than a similar device performing an SAT based model checker. The Boolean model further allows application of further formal reasoning verification techniques that SMT solvers are not designed to apply, thus creating further inefficiencies in the operation of the computing devices.

Figure 2:
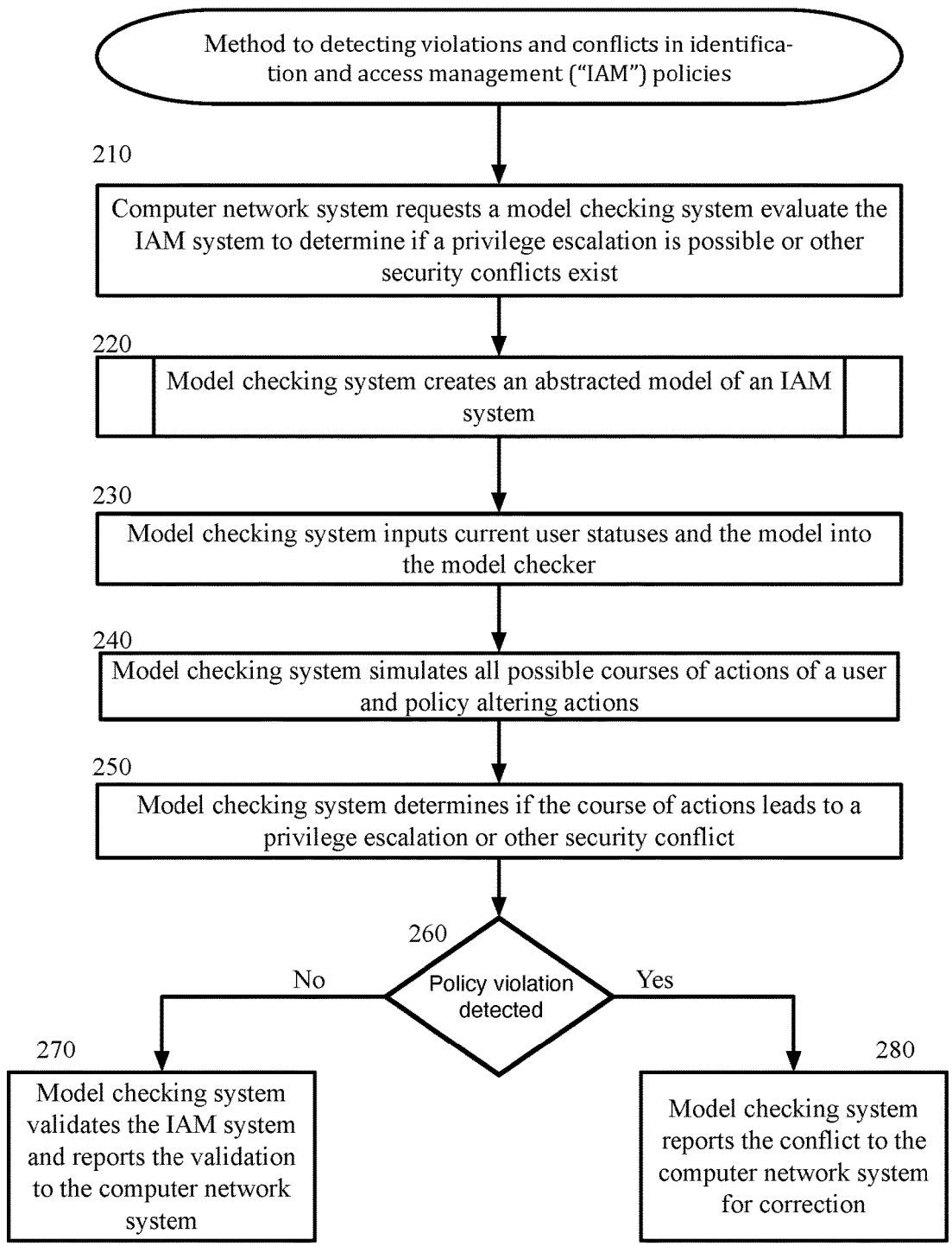
FIG. 2 is a block flow diagram depicting a method to detect violations and conflicts in IAM policies, in accordance with certain examples.
Figure 3:
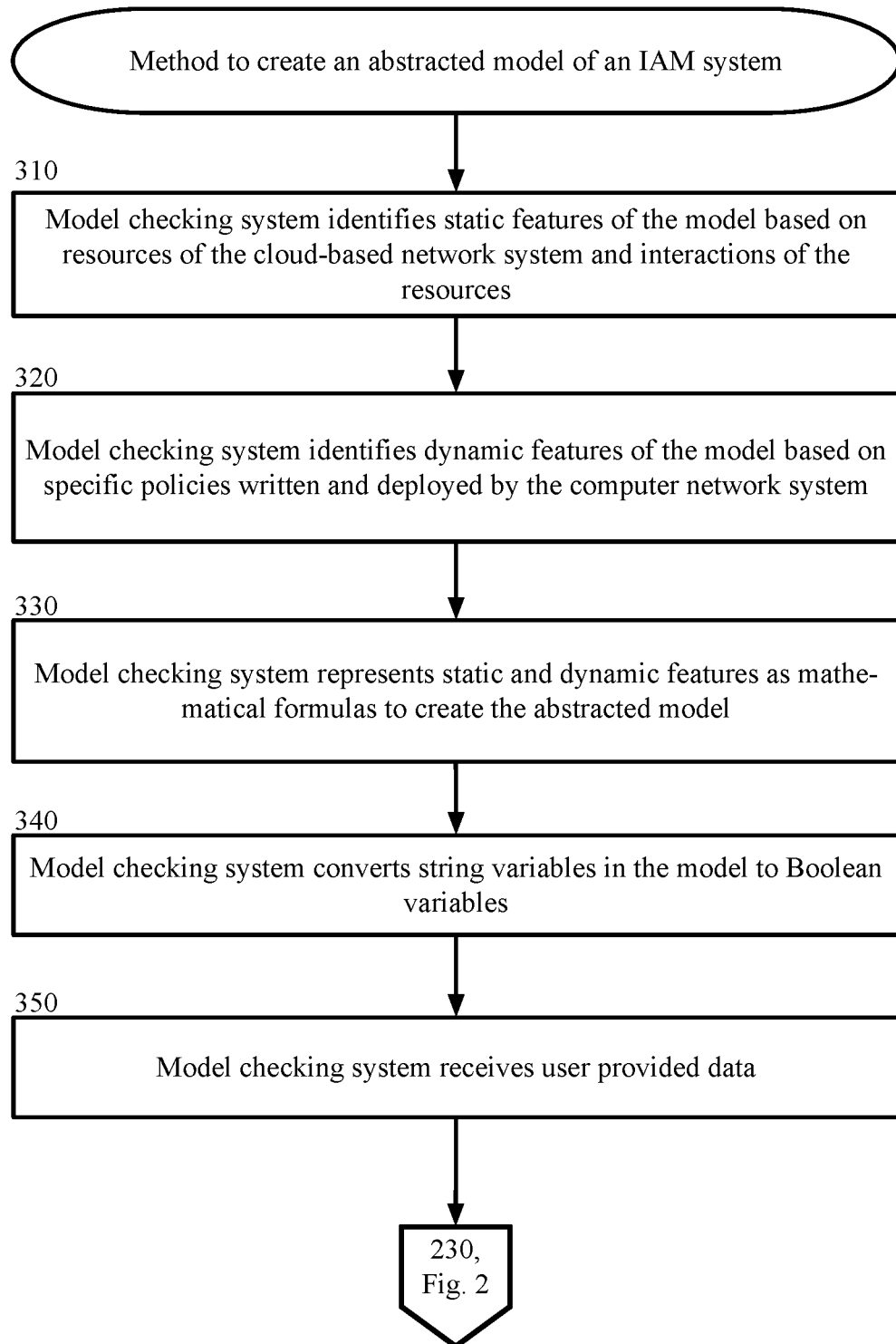
FIG. 3 is a block flow diagram depicting a method to create an abstracted model of an IAM system, in accordance with certain examples.
Figure 4:
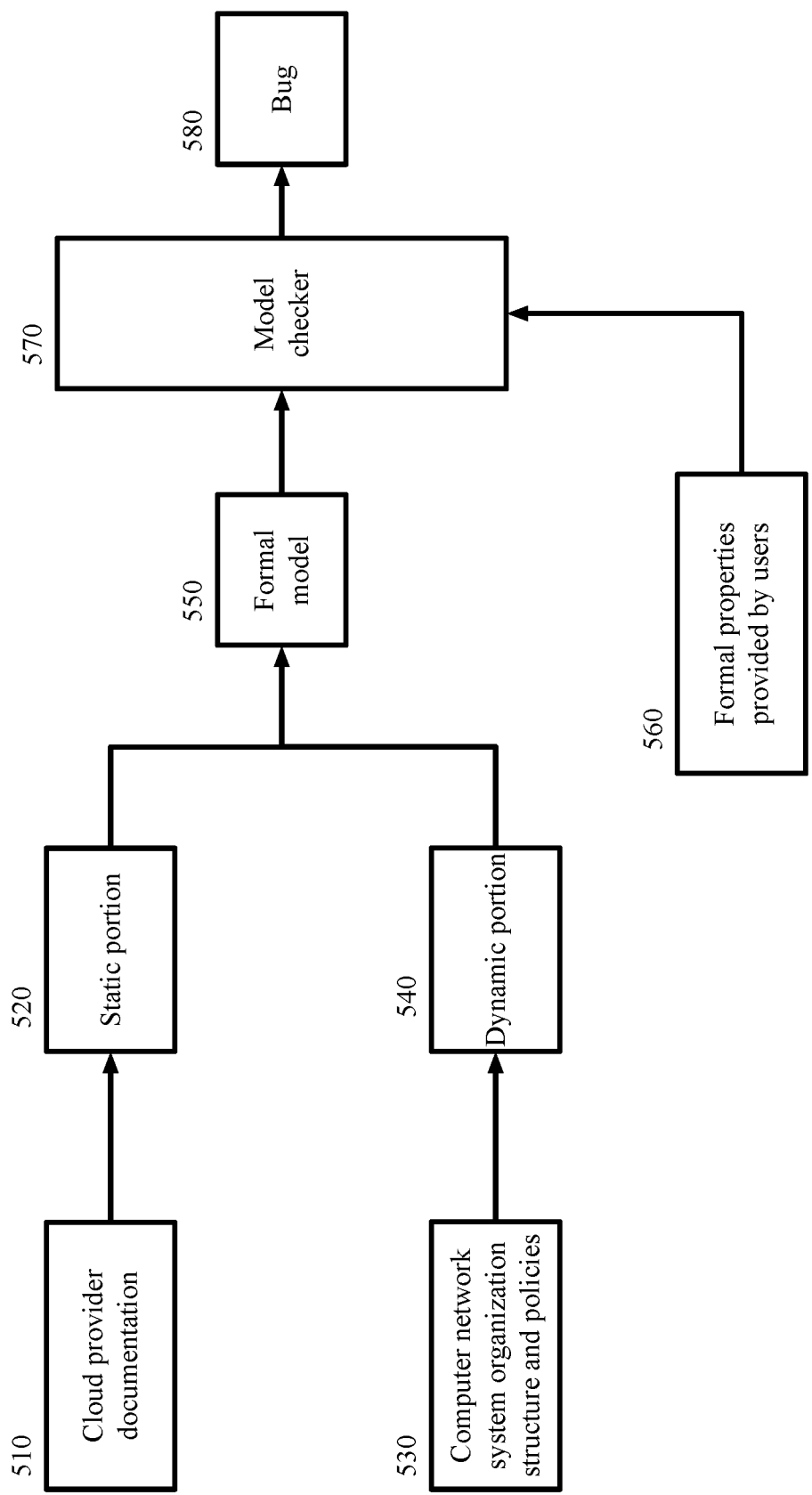
FIG. 4 is a block diagram depicting components for creating a model checker process, in accordance with certain examples.

The example methods illustrated in FIGS. 2-4 are described hereinafter with respect to the components of the example communications and processing architecture 100.

FIG. 2 is a block flow diagram depicting a method 200 to detect violations and conflicts in IAM policies, in accordance with certain examples.

In block 210, a computer network system 120 requests a model checking system 150 evaluate an IAM system to determine if a privilege escalation is possible or other security conflicts exist. The computer network system 120 may be any suitable system operating the user experience for an organization or entity. The computer network system 120 may be employed by a financial institution, a university, an industrial organization, a government agency, or any other entity that interfaces with client or users.

The computer network system 120 employs a server 125 or other devices to interface with users, store files, access databases, or perform any other actions to allow users to conduct financial transactions, register for events, place orders, or perform other suitable actions. The computer network system 120 desires to limit the access to users to prevent accidental or malicious interference with sensitive documents, private applications, secure databases, network management operations, or any other non-public functions. The computer network system 120 employs an IAM system to control access of users to system functions. Users may include individual customers, corporate entities, computer network system 120 employees, contractors, network service technicians, cloud provider system 140 employees, or any other suitable user. The IAM system has policies that dictate which users can access which system or function. The IAM system is a series of rules, authorizations, access levels, and other procedures to carry out the polices.

The server 125 may employ the cloud provider system 140 to implement any of the functions of the IAM system. For example, different functions and aspects of the IAM system, such as servers, web connections, storage space, software infrastructure, or web site hosting, may be performed by the cloud provider system 140.

The IAM system is designed to prevent a malicious actor from gaining access to any secure or private programs, data, applications, or other feature of the computer network system 120. The malicious actor may attempt to gain privileges to these features from a malicious actor computing device 130. For example, the malicious actor uses a communication application 135 to log on to the computer network system 120 via the IAM system. The malicious actor attempts to elevate his or her privileges on the computer network system 120.

In an example, a malicious actor, User X, attempts to elevate the privileges that User X is allowed. User X has initial access to Role A. User X desires to gain access to a document, Document D, to which the system has denied access. The IAM system has a rule to "never allow User X access to Document D." The User X discovers a conflict in the rules, or a bug, that allows access to Document D. For example, User has initial access to Role A. User X assumes Role A. Role A allows users to attach policies to their accounts. User X (via Role A) attaches to User X full privileges policy. User X gains access to document D under the full privileges policy. User X has elevated the intended privileges that the IAM system originally bestowed on User X. User X has gained the privilege to access documents or perform tasks that were intended to be inaccessible to this user.

This unintended consequence is due to a "bug," a mismatched policy, a policy conflict, a hacked policy, a loophole, or other violation. The bug in the example is a bug that occurs over a series of steps of the User X. For example, if the policy allowed User X to access the Document D in error, that would be simple for a one-step model checker to detect. However, User X had to assume a Role A and then use the new authority granted by the Role A to alter User X privileges and access Document D. This series of steps requires a more complex model and more sophisticated model checking.

The computer network system 120 is typically incapable of completely testing every series of events that would create a mismatch of the policies. The computer network system 120 therefore contacts the model checking system 150 to request that the IAM system be abstracted as a model and then checked for conflicts and security violations. In an alternate example, the model checking system 150 is a function of the computer network system 120. That is, the computer network system 120 may employ a server or a software program to perform the services of the model checking system 150. In another example, the model checking system 150 is a separate entity. The computer network system 120 may contract, employ, or in any other way hire the model checking system 150 to perform the functions described herein.

In block 220, the model checking system 150 creates an abstracted model of an IAM system. The method of block 220 is described in greater detail in the method 220 of FIG. 3.

FIG. 3 is a block flow diagram depicting a method 220 to create an abstracted model of an IAM system, in accordance with certain examples.

In block 310, the model checking system 150 identifies static features of the model based on resources of the cloud provider system 140 and interactions of the resources. The static features include resources, actions, principles, and the interactions of these functions and the users derived from the documentation of the cloud provider system 140. The services of the cloud provider system 140 represent the rules on which the IAM system operates. The changing rules and policies of the IAM system or the computer network system 120 may be configured in different ways to allow operations as desired while protecting secured information. The cloud provider system 140 may allow a device such as the server 125 of the computer network system 120 to host online services for users, store online data, distribute storage virtually, provide applications to user computing devices 110, or perform any other cloud-based services. The rules and policies imposed by the cloud provider system 140 are used to develop the static portion of the model.

In an example formula, the system determines if a policy is attached to a particular user. A simplified version of the formula is:

(Action=AttachPolicyToUser and Resource=$u$ and
    Policy=$p$)->next(IsPolicyAttachedToUser($p,u$))=
    True In block 320, the model checking system 150 identifies dynamic features of the model based on specific policies written and deployed by the computer network system 120. The dynamic features include the specific structure, resources, and policies of the IAM system. The policies may be recorded on virtual documents, in the operating system of the computer network system 120, in the instructions and operating procedures of the computer network system 120, in the software documentation of the computer network system 120, or in any suitable location. The policies may be directed to user access, resource allocation, user allowable actions, or any other suitable policies. The features may be dynamic because the rules for access may be changed frequently by the computer network system 120. Further, user access levels may change frequently based on user qualifications. For example, a user may change access levels frequently based on the amount of funds the user has in an account, the service package the user has signed up for, or the rewards offers the user has accumulated.

In an example formula, a user is denied access to a secure document, but is allowed to attach policies to a certain user named "JohnDoe.". A simplified version of the dynamic formula is:

(Effect=Deny and Action=* and
    Resource=SecretDoc) and (Effect=Allow and
    Action=AttachPolicyToUser and
    Resource=JohnDoe)

In block 330, the model checking system 150 represents static and dynamic features and other features as mathematical formulas to create the abstracted model. The model may be created in any suitable software language or modeling software. The model may be a series of logical formulas that each determine what options are available to a user based on simulated input of a user and simulated user statuses. For example, the model interprets each instruction from the software that manages the IAM system, and converts the software code to a machine-readable mathematical formula. The mathematical formulas are assembled into a model of the system that may be simulated in a model checking software environment. The model may be hosted on a software or hardware application that models business programs or other environments. The model receives initial inputs to certain variables and simulates the results of such inputs on other formulas and variables in the model. For example, based on an input of a user as an entry level customer, the model simulates the environment of the IAM system to determine all of the resources to which the user has access and determines if any conflicts exist.

In block 340, the model checking system 150 converts string variables in the model to Boolean variables. Certain model checkers use satisfiability modulo theories ("SMT") solvers. An SMT instance is a generalization of a Boolean Satisfiability ("SAT") solver in which various sets of variables are replaced by predicates from a variety of underlying theories. SMT formulas allow the use of a richer modeling language than with Boolean SAT formulas. For example, an SMT solver allows a model to use formulas at the word rather than the bit level. String variables are word level variables including letters, numbers, spaces, or commas. Thus, when the model checking system 150 uses an SMT solver, the system reads the word level string variables to look for bugs. The SMT solving process operating on a word level model can be more computationally expensive, slow, and cumbersome compared to an SAT based model checker operating on a Boolean model as described.

An example string type variable in an SMT solver is:

(Effect=Allow and Action=AttachPolicyToUser and
    Resource like "Dev-*") and (Effect=Allow and Action=DetachPolicyToUser and
    Resource like "*-test")

This policy allows attaching policies to a user named "Dev-Alice," detaching policies from a user named "Bob-test", and attaching and detaching policies to/from a user named "Dev-Carol-test."

While SMT solvers allow this type of functionality, the model checking system 150 in the examples only needs to know whether a name matches a regular formula and does not require the string data, such as the string length, the characters, and indexes. Thus, an SAT solver may be used instead of an SMT solver to save time and processing capacity.

In the example, the model checking system 150 pre-computes a match of each names to all the regular expressions across all policies. The model checking system 150 stores the matches in Boolean variables. For example:

Let A represent "Dev-*" and B represent "*-test"

"Dev-Alice" is A=True and B=False

"Bob-test" is A=False and B=True

"Dev-Carol-test" is A=True and B=True

Using these expressions, the model checking system 150 can further determine:

"Dev-Dave-test" is A=True and B=True

"Dev-Eve-test" is A=True and B=True

"Dev-Frank-test" is A=True and B=True

Thus, the model checking system 150 does not need to identify a difference between the users based on string data. The user's information conforms to the same regular expressions and have the same permissions. The model checking system 150 does not need to know each user's entire name or other data in the string. All the required information is contained in the Boolean expression.

In block 350, the model checking system 150 receives user provided data. The data may be entered by a user into a user computing device 110 or other device with a user interface. The data may be entered by the user into the IAM system, such as by signing into the system at the time of use. Alternatively, the data may be stored from previous events, such as previous transactions. The data may be gathered from the user computing device 110, such as from metadata. The data may come from any other suitable source. The data may include a username, phone numbers, demographics, account information, authorizations, or any other suitable data. The user may control access to certain information that may be considered private or sensitive, such as certain demographic information or financial information.

From block 350, the method 220 returns to block 230 of FIG. 2.

Returning to FIG. 2, in block 230, the model checking system 150 inputs current user statuses and the model into the model checker. The model checking server 155 or other device inputs the modeled system and the user provided data into the model checker algorithm, software, or other model checker processor.

In block 240, the model checking system 150 simulates all possible courses of actions of a user and policy altering actions. The model checking system 150 enters the options for each Boolean variable, such as True or False. Because the options in the Boolean SAT solver are discrete Boolean entries, simulations varying each variable are possible without requiring excessive processing capacity or time. The model checking system 150 is able to not just simulate the system with the existing user data, but is able to model multi-step process of the IAM system. That is, variables may be updated as the model progresses. For example, after initial conditions are assessed, the model checker updates the variables based on the simulation using the initial conditions and performs the model simulation again. This process may be repeated with updated variables until all possible permutations are exhausted.

In an example, a particular Boolean variable is simulated as True in a first simulation, then the simulation is performed with all possible permutations that might occur with the particular Boolean variable as True. Thereafter, the particular Boolean variable is simulated as False in a second simulation, then the simulation is performed with all possible permutations that might occur with the particular Boolean variable as False. If bugs are not found under either configuration, then the model checking system 150 may proceed to check other Boolean variables for bugs.

In block 250, the model checking system 150 determines if the course of actions leads to a privilege escalation or other security conflict. In an example, if a user is not allowed access to a particular file, the simulation will vary every relevant variable in multiple steps as described herein to determine if a sequence of steps will ever give the user access to the particular file. If a sequence of steps will allow a user to escalate the privilege of the user, such as by gaining access to files, functions, data, or applications to which the user should not have access, then the model checking system 150 will identify this bug. The bug is any sequence of steps, policy violation, mismatched rules, conflicting rules, or any other problem with the policies that allow this privilege escalation.

In an example of the simulation, the model checker simulates that User X has signed in with initial privileges. The model checker identifies all the privileges that User X has when simulating that User X is signed in. User X is specifically prevented from having access to Document D. However, User X does have initial access to Role A. During the first pass of the simulation, a conflict is not evident because User X is prevented from accessing Document D. Subsequently, the model checker simulates that User X assumes Role A. The model checker will now identify all the privileges that User X has while under Role A. The model checker determines that while under Role A, User X has access to Document D. The model checker determines that a series of events are thus possible in which User X has gained access to a Document D that was specifically withheld from User X. The model checker determines that this is a policy conflict or bug. The bug was only identified after a series of events occurred. The initial conditions before assuming Role A did not identify the bug. At least a second iteration (after assuming Role A) was required before the conflict was identifiable.

In block 260, if the model checking system 150 does not determine that a policy violation or bug exists, then the method 200 follows the NO branch of block 260 to block 270. If the model checking system 150 determines that a policy violation or bug exists, then the method 200 follows the YES branch of block 260 to block 280.

In block 270, when the model checking system 150 determines that the model checker did not identify a policy violation or bug, the model checking system 150 validates the IAM system and reports the validation to the computer network system 120. The model checking system 150 communicates to the computer network system 120 that all user entry options have been simulated and a user will be unable to exploit a loophole or conflict in the policies to gain access to secure documents or applications.

In block 280, when the model checking system 150 determines that the model checker identifies a policy violation or bug, the model checking system 150 reports the conflict to the computer network system 120 for correction. The correction by the computer network system 120 may include a change to the rules or privileges extended to the user. For example, the computer network system 120 includes a second verification step for a user, increases the security for an administrator sign-in, revises a conflicting policy, removes a loophole in the policies, or performs any other action to remove the policy violation. After correction, a malicious actor will not be able to escalate the privilege or in any other way gain access to secure documents or applications.

FIG. 4 is a block diagram depicting components for creating a model checker process, in accordance with certain examples. FIG. 4 provides an additional visualization of the components that make up the model and perform the model checking process.

In block 510, documentation from a cloud provider system 140 is provided by the cloud provider system 140 to the model checker system 150, as described in greater detail in block 310. The documentation is associated with the rules required by the cloud provider system 140 to manage the services provide by the cloud provider system 140, such as servers, web connections, storage space, software infrastructure, or website hosting. In block 520, the documentation from a cloud provider system 140 makes up the static portion of the policies that are provided to make up the formal model. In other examples, the network computing system 120 provides additional static rules. For example, the network computing system 120 provides policies related to structural, hardware, storage, or other systems that are not frequently revised or changed based on the operations of the IAM system.

In block 530, documentation from the IAM system of the network computing system 120 is provided by the network computing system 120 to the model checker system 150, as described in greater detail in block 320. The dynamic features include the specific structure, resources, and policies of the IAM system. The policies may be directed to user access, resource allocation, user allowable actions, or any other suitable policies. In block 540, the documentation from the IAM system of the network computing system 120 makes up the dynamic portion of the policies that are provided to make up the formal model. In other examples, other systems, such as the cloud provider system 140, provide additional dynamic rules.

In block 550, the model checker system 150 creates the formal model, as described in greater detail in block 330. The static and dynamic portions of the policies and rules are provided to the formal model 550. The model checking system 150 represents static and dynamic features as mathematical formulas to create the abstracted model.

In block 560, the model checker system 150 inputs formal properties, such as current user statuses, into the model checker, as described in greater detail in block 230. The user input may include the user identification and password, the user account information, the user security level, the type of user computing device 120 used to input data, or any other suitable data required by the IAM system to operate.

In block 570, the model checker system 150 receives the model and the user input and performs the model check as described herein in FIG. 3. The system identifies bugs or other policy violations and outputs the bug information in block 580 as described in FIG. 3.

Example Systems

FIG. 5 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain examples, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device, for example, a system on chip (SOC), system on package (SOP), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Additionally, any reference to an act being performed by a computer should not be construed as being performed by a single computer as more than one computer may perform the act.

The example examples described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the examples presented previously are illustrative, and, in alternative examples, certain acts can be performed in a different order, in parallel with one another, omitted entirely, and/or combined between different example examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

What is claimed is:

1. A system to prevent multi-step security attacks, comprising:
 a storage device; and
 a processor in a network system communicatively coupled to the storage device, wherein the processor executes application code instructions that are stored in the storage device to cause the system to:
  identify static and dynamic features of an identification and access management ("IAM") system operated by a network computing system;
  based on the static and dynamic features, create a formal model of the IAM system;
  receive input of statuses of a simulated user into a Boolean solver based model checker that simulates users in the formal model, the status comprising at least a privilege status of the simulated user;
  simulate, via the Boolean solver based model checker, every first action available to the simulated user, wherein at least one first action escalates the privilege status of the simulated user;
  simulate, via the Boolean solver based model checker, every available subsequent course of action of the simulated user after the simulating of each of the first actions, wherein at least one of the subsequent courses of action is permitted based on the escalated privilege status;
  determining that the privilege escalation leads to a security conflict; and
  revise the static features or the dynamic features based on a determination that the privilege escalation leads to the security conflict.

2. The system of claim 1, wherein the application code instructions further cause the system to receive user data from a user computing device.

3. The system of claim 1, wherein simulating the courses of action comprises applying a Boolean solver that applies an SAT solver based model checker to simulate actions of a user and the IAM system to identify the security conflict.

4. The system of claim 1, further comprising converting string variables of the abstract model to Boolean variables, the string variables arc being word level variables comprising letters, numbers, spaces, or commas.

5. The system of claim 4, wherein the string variables comprise string data comprising one or more of string length, string characters, and indexes.

6. The system of claim 4, wherein converting string variables of the abstract model to Boolean variables comprises determining if a name associated with a user matches a regular expression across policies of the IAM system.

7. The system of claim 1, wherein the security conflict is identified when the simulated user is granted access to a particular feature by a first policy and restricted from access to the particular feature by a second policy.

8. The system of claim 1, wherein the application code instructions further cause the system to receive a request to evaluate the IAM system from a computer network system associated with the IAM system.

9. The system of claim 1, wherein the static features are associated with services provided by a cloud computing system providing services to the IAM system.

10. The system of claim 1, wherein the dynamic features are associated with services provided by the network computing system.

11. The system of claim 1, wherein the dynamic features are associated with policies managed by the IAM system.

12. The system of claim 1, wherein the application code instructions further cause the system to report identified policy violations to the network computing system.

13. The system of claim 1, wherein the application code instructions further cause the system to report to the network computing system that policy violations were not identified.

14. A method to prevent multi-step security attacks, comprising:
  by a computing device in a network computing system:
    identify features of an identification and access management ("IAM") system operated by a network computing system; based on the static and dynamic features, create an abstract model of the IAM system;
    receive input of statuses of a simulated user into a model checker that simulates users in the abstract model, the status comprising at least a privilege status of the simulated user;
    simulate, via the model checker, every first action available to the simulated user, wherein at least one first action escalates the privilege status of the simulated user;
    simulate, via the model checker, every available subsequent course of action of the simulated user after the simulating of each of the first actions, wherein at least one of the subsequent courses of action is permitted based on the escalated privilege status;
    determining that the privilege escalation leads to a security conflict; and
    revising the static features or the dynamic features based on a determination that the privilege escalation leads to the security conflict.

15. The method of claim 14, wherein applying the model checker comprises simulating actions of a user and the IAM system to identify the security conflict.

16. The method of claim 14, wherein the security conflict is identified when the simulated user is granted access to a particular feature by a first policy and restricted from access to the particular feature by a second policy.

17. The method of claim 14, wherein the simulated user is granted access to a particular feature by a first policy and restricted from access to the particular feature by a second policy only after a plurality of intermediate steps in a series of iterations of the application of the model solver.

18. The method of claim 14, the simulated user is initially restricted from access to a particular feature by a first policy and subsequently granted access to the particular feature after altering a status of the user in a first simulation step.

19. The method of claim 14, wherein static features of the model are associated with services provided by a cloud computing system providing services to the IAM system.

20. The method of claim 14, wherein dynamic features of the model are associated with services provided by the network computing system or policies managed by the IAM system.

* * * * *